(No Model.) 3 Sheets—Sheet 3.
W. D. BOHM.
APPARATUS FOR SEPARATING GOLD AND SILVER FROM ORE.
No. 464,672. Patented Dec. 8, 1891.
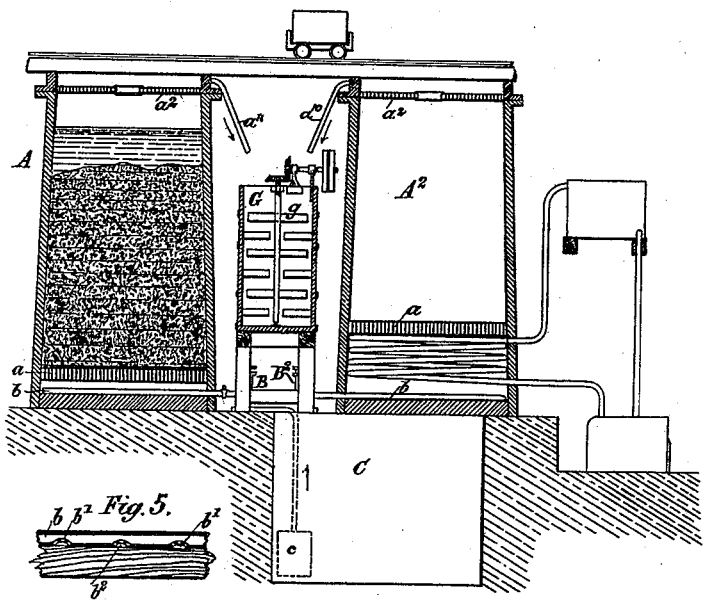
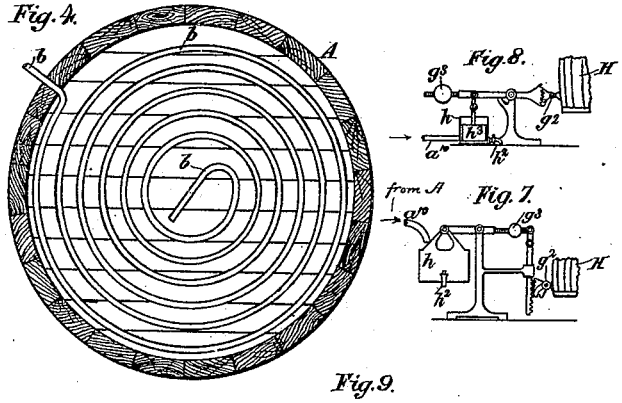
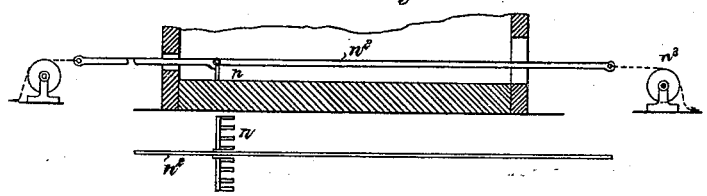
Witnesses
George Baumann
John Revell
Inventor
William D. Bohm
By his Attorneys
Howson and Howson

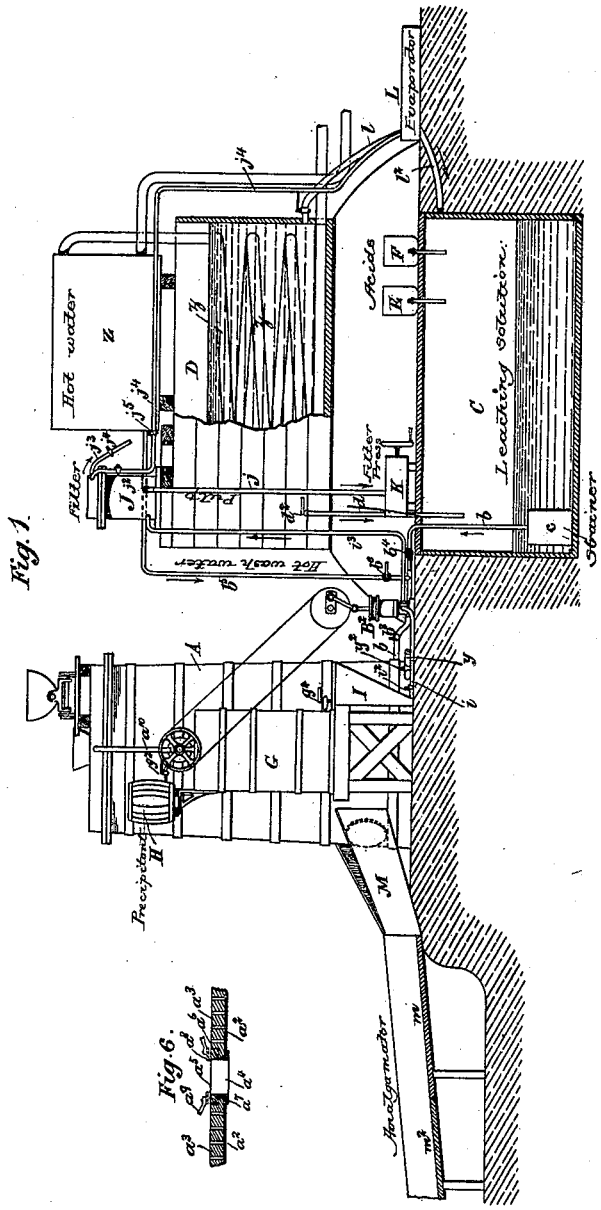

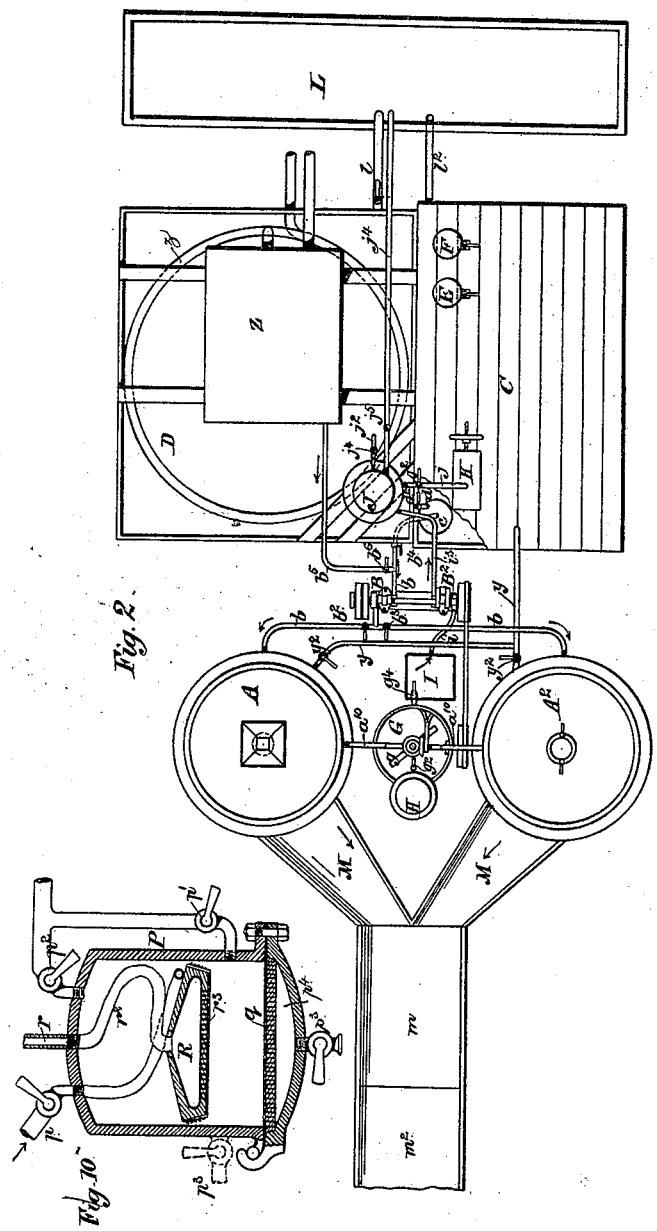

UNITED STATES PATENT OFFICE.

WILLIAM D. BOHM, OF LONDON, ENGLAND.

APPARATUS FOR SEPARATING GOLD AND SILVER FROM ORE.

SPECIFICATION forming part of Letters Patent No. 464,672, dated December 8, 1891.

Application filed April 24, 1890. Serial No. 349,409. (No model.) Patented in England February 28, 1890, No. 3,246.

*To all whom it may concern:*

Be it known that I, WILLIAM DUNSMORE BOHM, metallurgical chemist and engineer, a subject of the Queen of Great Britain and Ireland, and residing at 51 The Avenue Acton, London, in the county of Middlesex, England, have invented certain Improvements in and Apparatus for the Separation of Gold and Silver from Ores or Materials Containing them, (for which I have applied for a patent in Great Britain, No. 3,246, dated February 28, 1890,) of which the following is a specification.

My invention has for its object to provide means whereby gold or silver, or both, can be obtained very conveniently and efficiently from ores or materials—such as jeweler's sweepings, ground slags, &c.—containing them with but little hand labor and great economy in time and materials employed.

According to my invention I place the powdered or divided ore or material to be treated for the obtainment of the gold or silver, or both, in a vessel or vat or vessels or vats, and through it I pass the leaching solution, which I preferably previously heat. I force by means of a force-pump the leaching solution up through the ore and through a filter at the top. I then pass the solution and the precious metal which it now contains into a vessel, in which I agitate it with a precipitating agent. From this last-named vessel the solution is forced up by a force-pump through a vessel having a filtering arrangement, such as a porous diaphragm at the top, so that the solid matter is retained thereby, the liquid passing off to be heated again and to be restrengthened by the addition of the necessary further quantity of leaching chemicals and passed back to the leaching vat or vats for reuse. The pressure under which the liquids are forced up through the leaching-vat and precipitant vessel should be at least eighteen pounds per square inch. At intervals the solid matter retained by the last-named filtering-vessel is passed into a filter-press or equivalent apparatus, whereby it is deprived of the greater part of its moisture. The ore which has been leached is then drained of all solution and washed free from the last traces thereof with water, (preferably hot,) and then can be washed out of the vat or vats with acidulated water and passed over zinc or alloy of zinc with other suitable metal, so that hydrogen is evolved, which reduces any precious metal still remaining in the ore to the metallic state or such state that it is taken up when the ore is afterward passed over mercury—for instance, over amalgamated copper.

I preferably arrange the apparatus with two leaching-vats, so that they can be worked alternately, and I will describe an arrangement of apparatus according to my invention on this plan with reference to the accompanying drawings.

Figure 1 is an elevation, partly in section; Fig. 2, a plan; and Fig. 3, a transverse section across the leaching-vats, the other figures showing details, as hereinafter described. The two leaching-vats A A² are placed in convenient proximity to each other. Each of them is provided with a porous or perforated false bottom $a$, covered preferably with coarse canvas, upon which the ground or reduced ore to be leached rests. Under this is the coil or the like, by which the leaching solution is admitted in such a manner that it is equally distributed over the bottom of the vat.

Fig. 4 is a plan of the bottom of one of the vats, showing the coil $b$ in place; and Fig. 5 is a vertical section of part of the same. The said coil or the like is preferably perforated at its under side in places which are pressed in, as shown at $b'$, Fig. 5, so as to be clear of the bottom of the vat. The coil or pipe $b$, provided with cocks $b^2$ $b^3$ $b^4$, leads from a strainer $c$ in a tank or vessel C, containing the solution, which is heated in any suitable way—for instance, by a jacket or a coil through which hot water is passed; but I preferably employ a heating-chamber, as shown at Z, but in practice preferably placed on or in proximity to the flue of the boiler, by which water may be heated to be passed into a jacket or coil $z$ in the vessel D, into which the solution may be passed from the vessel J before the said solution enters the tank C. I employ a force-pump B, which draws the solution from the tank C, into which it is run after it is heated, and in which solvents, such as hydrochloric acid or sulphuric acid, and bromine, or any of them, may be added to it, (from the vessels E and F, for instance,) the said pump B forcing the solution into one or the other of the leaching-vats, according to which of the cocks $b^2$ $b^3$ is open. In the tank C chloride of sodium may be placed to preserve the strength of the solution. The upper part of each leaching-vat is provided with a filtering medium $a^2$, preferably stretched over a perforated false head $a^3$, as shown by the enlarged view of part thereof in Fig. 6. The hole $a^4$ therein, through which the ore is charged, is preferably covered also with filtering material $a^5$, secured by means of a ring $a^8$, screwed down by the screws $a^9$ on to a bushing $a^7$ in the said hole. This bushing $a^7$ is provided with a screwed ring $a^6$ and flange, by which latter the edge of the main part of the filtering material $a^2$ is held between itself and the perforated false head $a^3$. The cock $b^4$, and also one or the other of the cocks $b^2$ or $b^3$, according to which vat is to have its contents leached, being open, (the cock $b^6$ on the pipe $b^5$ being closed,) the solution passes through the ore in that leaching-vat and then passes by the pipe $a^{10}$ from that vat into a mixing apparatus G, situated between the leaching-vats and provided with reciprocating or rotating stirrers $g$ or other agitating device and having in proximity to it a vessel H, containing a precipitating agent—such, for instance, as polysulphide of calcium, which is fed into the solution in the said agitating-vessel G by means of a tap or valve $g^2$, preferably controlled so that it passes only a quantity of the precipitating agent in proportion to the quantity of solution passing, this regulation of the quantity being essential when such a precipitant as polysulphide of calcium is used, because an excess of the precipitant would negative the result of the previous treatment by rendering (when the solution is returned to the leaching-vat) the metals insoluble. This tap or valve may be operated by the weight or pressure of the solution passing, so that the solution by entering, for instance, a vessel may by its weight or by raising a float operate a lever with which it is connected to open the tap which supplies the precipitating agent, and when the solution decreases in flow or ceases flowing the said tap is correspondingly partly or wholly closed.

Fig. 7 shows an arrangement wherein a vessel $h$ is used, into which the liquid from the leaching-vat enters by the pipe $a^{10}$ and normally passes off at the same rate by the cock $h^2$; but if it enters by the pipe $a^{10}$ more quickly it accumulates and its weight increases the passage-way through the tap $g^2$ by acting thereon through the lever and rack shown, the latter operating the tap $g^2$ through the quadrant upon its plug. The position which the vessel $h$ assumes in relation to the tap is regulated by the adjustable weight $g^3$.

Fig. 8 shows an arrangement wherein a movable float or piston $h^3$ is used, the vessel $h$ not being itself movable, the parts which correspond with those shown in Fig. 7 being marked with the same letters of reference. The solution with the metal in suspension is then run by the cock $g^4$ into a receiver $l$, from which it is drawn through the pipe $i$ and cock $i^2$ by a pump $B^2$ and delivered by the pipe $i^3$ into the vessel J. In this vessel J the solution is passed upward through a filter and the solid matter is retained to be at intervals discharged by the pipe $j$ and cock $j^2$ into a filter-press K or the like, the liquid from which can run into the tank C. The liquid which passes through the filter is discharged by the pipe $j^3$ and cock $j^4$ into the vessel D, which is heated by the hot water or other heating agent in any suitable way—for instance, by the coil $z$—as shown, led from the hot-water tank Z, as hereinbefore mentioned. The solution is then run by the pipe $d$ and cock $d^2$ into the vessel C, in which the requisite chemicals are added to fit it for reuse in the leaching-vats, and whereupon it is drawn by the pump B, which forces it into the leaching-vats, as already explained. The ore may then be washed with hot water drawn from the tank Z by the pump B through the pipe $b^5$ and cock $b^6$, (cocks $b^4$ and either $b^3$ or $b^2$ being closed,) it passing through one or other of the vats into the mixer, and is pumped up through the filtering-vessel J, and from thence passes by the pipe $j^4$ and cock $j^5$ to the evaporator L, where it is concentrated before being admitted by the pipe $l^2$ to the vessel C.

The vessel J may contain layers of granulated or "cement" copper supported upon perforated trays for precipitating any precious metal, or this may be effected by electrolysis by providing the vessel with electrodes, in both of which cases it will only be necessary to force the liquor containing the precious metals in solution through the vessel J to effect precipitation, no polysulphide of calcium or other precipitating agent being used in addition, so that I may, if desirable, connect the suction-pipe $i$ of the pump $B^2$ directly to the pipe $a^{10}$ of either of the vats A or $A^2$ and force the solution directly into the vessel J without first passing it through the agitator G and the receptacle I.

After the charge of ore in either of the leaching-vats has been leached and washed as described the communication with the force-pump is closed and acidulated water is (by a hose or other convenient means) passed into the leaching-vat and the ore washed out, the said ore passing down a guide or chute M, leading from the outlet of the vat to the zinc and amalgamated plates marked $m$ and $m^2$, respectively, or I may remove matter remaining in the leaching-vat without washing it over the plates $m$ and $m^2$, in which case I use a rake $n$, as shown in Fig. 9, connected with a rod $n^2$ passing through the vessel, so that it can draw the rake back, (the teeth yielding to allow of this,) and then by means of a rope connected with a purchase-pulley $n^3$ the rake, and with it the ore, can be drawn toward the discharge-door of the leaching-vessel. A purchase-pulley and rope may also be provided, as shown, for drawing back the rake.

$y$ is a pipe, and $y^2$ are cocks by which leaching solution, which it may be required to pass from the vats to the tank C, can be drawn off.

Instead of using a separate heater for the leaching solution, it may be heated by a hot-water coil or the like below the perforated false bottom in the leaching-vat, as shown with regard to the vat $A^2$ in Fig. 3, or the heat in the evaporator or concentrator L alone may be depended upon for heating the solution.

In place of passing the leaching solution through the leaching-vessels by a pump, it may be passed thereinto under the pressure due to its head.

When using two leaching-vats the pipes are provided with cocks, as shown, so that the solution can be forced into either vat while the washing out of the other vat is being performed, or, if desired, the contents of both vats may be leached at the same time. The leaching-vats may, if desired, be provided with stirrers or agitators to stir or agitate the charge during treatment.

The filter-press may be of any suitable kind; but I prefer to use one, such as is shown at Fig. 10, consisting of a casing P, with an inlet $p$ for the matter to be pressed, led by a flexible tube down to just above the float R, (or as shown in dotted lines at $p^3$,) and inlets $p'$ $p^2$ for air or gas under pressure, and with a hollow bottom $p^4$, with an outlet $p^5$ for liquid, and with a perforated false bottom $q$, covered with filter-cloth. This hollow bottom and the false bottom are preferably so connected to the casing, as shown, that they can be swung down or to one side when desired for removing the solidified matter. In this casing, and connected to an outlet $r$ for liquid, is a float R, made preferably of wood. It is hollow and its interior is connected by a movable connection or flexible tube $r^2$ with an outlet for liquid. The under side $r^3$ of the float R is perforated and is covered with filter-cloth. When the matter to be pressed is introduced, the inlet $p$ or $p^3$ is closed and air under pressure is admitted at $p^2$, the float R always resting on the matter in the filter, and the desired amount of moisture is forced off through the perforated bottom $q$ of the casing and the perforated bottom $r^3$ of the float. The inlet $p'$ for air is opened when it is desired to agitate the matter being pressed.

I claim as my invention—

In an apparatus for separating gold and silver from ores or materials containing them, a leaching vessel or vessels constructed with a perforated false bottom and a perforated false head and provided with means for introducing the leaching solution under pressure under the said false bottom, in combination with an agitating-vessel connected with the leaching-vessel and provided with means for automatically supplying the solution with a precipitating agent, a filtering apparatus through which the solution passes after leaving the agitating-vessel for separating the solid matter from the said solution, and a tank or vessel in which the solution can be strengthened for reuse by the addition of suitable solvents and having valved pipes connecting the tank with both the leaching-vessel and the filtering apparatus, substantially as described.

In testimony whereof I have signed my name to this specification in the presence of two subscribing witnesses.

W. D. BOHM.

Witnesses:
   WILLIAM F. UPTON,
   CHAS. MILLS,
*Both of 47 Lincoln's Inn Fields, London, W.C.*